June 15, 1954
M. GULLHOLM
2,680,871
ADHESIVE CONTAINER HAVING MEANS
TO REPLACE EVAPORATED SOLVENT
Filed Sept. 5, 1950
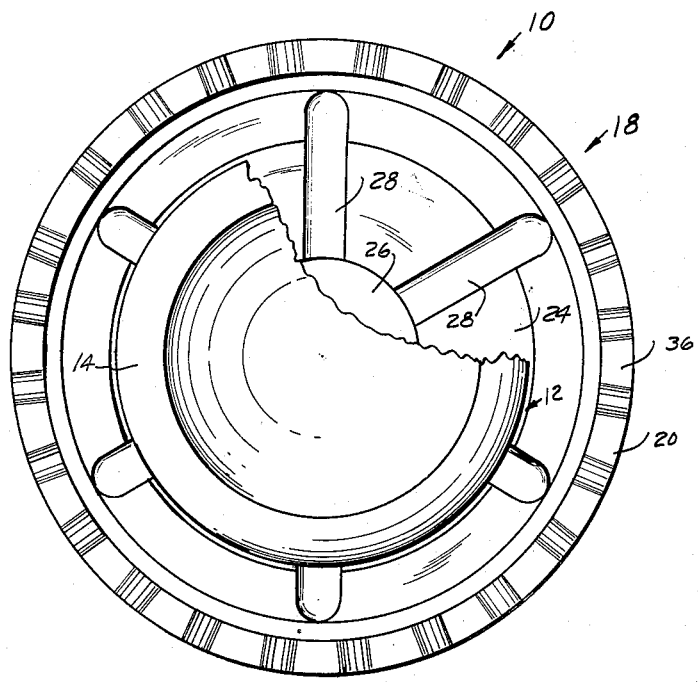
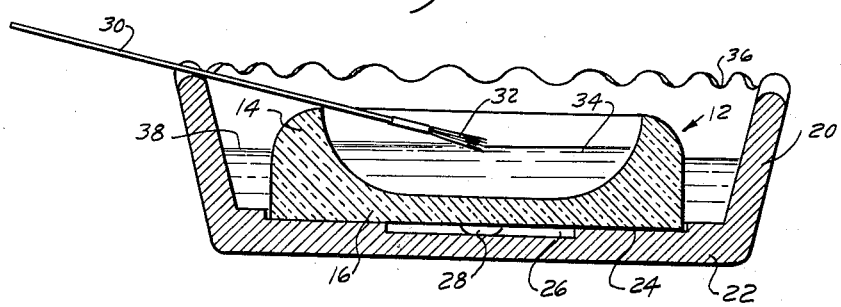
INVENTOR.
MARCUS GULLHOLM
BY
Whiteley and Caine
ATTORNEYS

Patented June 15, 1954

2,680,871

UNITED STATES PATENT OFFICE 2,680,871

ADHESIVE CONTAINER HAVING MEANS TO REPLACE EVAPORATED SOLVENT

Marcus Gullholm, St. Paul, Minn.

Application September 5, 1950, Serial No. 183,271

1 Claim. (Cl. 15—130.1)

My invention relates to improvements in an adhesive container. In particular it relates to a combination open-topped container preferably formed of two or more pieces and adapted to contain a mass of fluid or paste-like adhesive within one portion of the container in a condition ready for use, together with a second portion of the container adapted to contain a solvent or liquid which is capable of replacing liquid lost by evaporation from the adhesive mass and in the absence of which the adhesive mass is likely to dry out and thereby become ineffective for its intended purpose.

In workshops or factories of various types which engage in the assembly of furniture and wooden ware, dolls, the mounting of photographs or greeting cards, and the like, it is customary to provide some form of adhesive for securing the various elements in assembled relationship with each other. I am aware of the fact that there are numerous forms of containers and dispensers for adhesive intended for the general purposes of facilitating application to workpieces, but in some instances these containers and dispensers require manual manipulation, which is time-consuming and, moreover, these various types of prior art dispensers and containers are not all applicable to general use. From my knowledge, it has been a general practice in industry and workshops of the type mentioned heretofore to merely use a large container of bulk adhesive which is more or less open to the atmosphere and in conjunction with such container to use an applicator in the form of a brush or other spreader which is dipped into the adhesive and then applied to the work surface as a means of properly spreading the adhesive prior to the assembly operation. Where such open-topped containers are used, the adhesive mass being in contact with the atmosphere tends to lose a portion of its liquid content through the evaporation of solvents contained in the adhesive to give a fluidity to the adhesive material. Such evaporation results in caking of the solids and a general concentration of the mass which is likely to render the adhesive mass unsuitable for use.

It is the general purpose of the present invention to provide an open-topped container, preferably consisting of a first portion in the form of a cup-shaped porous membrane within which the adhesive mass is maintained in a condition ready for use. Surrounding the cup-like membrane and preferably formed as a separate element is a relatively shallow impervious container adapted to receive the membrane and to maintain a body of liquid solvent in surrounding relationship to the membrane so that the liquid may pass by osmotic pressure through the walls of the membrane to replace the portion of the liquid solvent which is normally lost by evaporation. The liquid container is of larger dimension than the porous membrane and is constructed in such a manner that it provides support for one end of a suitable applicator whose other end normally rests within the interior of the membrane so as to be available for ready use by an operator.

An object of the invention is to provide a combination container for fluid or paste-like adhesives having a first portion composed of a porous membrane adapted to receive the adhesives and maintain the same in a condition ready for use, together with a second portion adapted to contain the first portion and a liquid solvent which is capable of penetrating the membrane and replacing solvent normally lost from the adhesive by evaporation.

Another object is to provide a combination container for adhesive which includes a shallow open-topped porous cup-like member for containing adhesive, together with a second container of greater cross-dimensions than the first container, having means for supporting the first container within its interior, together with suitable passages and recesses for maintaining a liquid solvent in contact with a considerable area of the first container so that the solvent may penetrate the first container by osmotic pressure.

A further object is to provide a combination container consisting of a porous porcelain cup adapted to receive a fluid or paste-like adhesive, together with an impervious liquid container of greater dimensions than the cup surrounding the cup and having suitable means for maintaining a liquid solvent in contact with the bottom and side walls of the cup, and also having a side wall portion which extends above the plane of the cup and adapted to support one end of a spreader whose other end extends into the interior of the cup.

Other and further objects may become apparent from the following description and claims and in the appended drawing in which:

Fig. 1 is a plan view of an adhesive container forming the present invention with portions broken away; and, Fig. 2 is a cross-section taken through the center of Fig. 1.

Referring now to the figures of the drawing, general reference numeral 10 indicates an adhesive container which is adapted for general use in workshops or other places where various workpieces are being assembled and secured to each other by the application of a fluid or paste-like adhesive. Reference character 12 indicates a shallow, porous cup-like membrane preferably formed of unglazed porcelain or the like. The member 12 is formed as a single unit and is provided with an upstanding side wall 14 and a relatively thick cylindrical base portion 16. It should be understood that although the structure is shown and described as being of cylindrical configuration, I do not limit myself to the particular shape or size of the various elements.

Reference character 18 indicates an impervious liquid container formed of metal, glass or other plastic, having a continuous cylindrical side wall 20 which slopes outwardly and is joined at its lower extremity by a bottom wall 22. Within the upper surface of the bottom wall 22 is formed a first recess 24 within which the cup-like membrane 12 fits and is retained against lateral movement. Beneath the center portion of the cup-like membrane 12 the lower wall 22 has a second recess 26 which is about one-half of the area of the recess 24. Extending radially outwardly from the recess 26 and through the recess 24 to an area adjacent the side wall 20 are a plurality of grooves 28.

Shown loosely disposed on the top of container 18 is an applicator 30 which may be of any particular type or construction, but disclosed as a brush having bristles 32. The applicator 30 constitutes no part of the invention per se but is merely a means of spreading adhesive 34 contained within the cup-like member 12. The outer end of the applicator rests on the side wall 20 of the liquid container 18, and if desired, suitable grooves or recesses 36 may be provided to hold the outer end of the applicator 30.

As is well known, paste-like adhesives such as glue, library paste or other common forms of adhesive are composed of a solid portion and a liquid solvent which in many instances is water and is added to the solids for the purpose of forming an amorphous mass which has highly adhesive quality. Since water or other solvents are generally of an evaporable character, they will tend to evaporate from the mass 34 and leave the same in a caked or partially dried condition and which is of little value. To replace solvents lost by evaporation from the mass 34, a quantity of adhesive solvent indicated at 38 is maintained in the outer container 18, but it will be noted that the liquid level of the solvent is below the upper edge of the side wall 14 of the cup 12. Since the cup 12 is a porous membrane and the adhesive mass 34 will have considerable density, osmotic pressure will cause the solvent 38 to pass through the pores of the cup-like member 12 and enter into the mass 34 at a very slow rate, but, nevertheless, at a rate sufficient to replace solvent evaporated from the mass 34. It is recognized that various membranes may have different rates of permitting the passage of liquid, but in my experience, and using a glue as an adhesive, I have found that unbaked porcelain permits the passage of water at a rate slow enough so that the glue does not become excessively diluted. While the liquid level may be maintained at any desired level within the container 18, I have found that it is desirable to maintain liquid on the sides as well as the bottom of the cup 12 and to this extent the radially extending grooves 28 form a plurality of passages for conducting liquid underneath the cup 12 and into the inner recess 26 to thereby maintain solvent on the bottom as well as the sides of the cup-like member 12. Since it is customary to use some form of an applicator in spreading the adhesive, the brush-like portion 32 on the applicator 30 forms a common and well-known means of spreading glue, and since the applicator must be available for ready use at all times, I have related the size of container 18 and particularly its side wall 20, to the size of the cup-like member 12 so that the major portion or the center of balance of the applicator extends into the interior of container 18 and the inner applicator 32 is thus maintained in the adhesive 34 for ready use. Moreover, the side wall 20 is of a height so that the center of balance of the applicator 30 is within the interior wall, if need be, the height of the wall 20 may be regulated for this purpose, but my construction is particularly intended to maintain an ordinary brush with its center of gravity within the container so that it will not be knocked or jarred in such a manner as to fall off the container and spread the liquid adhesive onto the surface of a work table.

My invention is defined in the terms of the appended claim.

I claim:

An adhesive container, consisting of an imperforate shallow open-topped porous porcelain cup for containing a mass of fluid adhesive, and an open top container for maintaining a supply of solvent liquid in contact with the sides and bottom of the cup formed of a bottom wall of substantially greater area than the cup, said bottom wall containing a central recess and a plurality of radially disposed passages which extend outwardly from the recess beyond the outer limits of the cup for conducting liquid to the recess, said cup resting on the bottom wall of the container above the central recess and the inner ends of the passages in such a manner that solvent liquid is in contact with the sides and the bottom of the cup, said container having a peripheral side wall united to the bottom wall and with a portion of greater height than the porous cup for supporting one end of an applicator whose other end is disposed in the cup.

References Cited in the file of this patent

UNITED STATES PATENTS

| Number | Name | Date |
|---|---|---|
| 675,971 | Raymond | June 11, 1901 |
| 703,024 | Wade | June 24, 1902 |
| 1,928,810 | Burford | Oct. 3, 1933 |
| 2,204,784 | Abrams | June 18, 1940 |

FOREIGN PATENTS

| Number | Country | Date |
|---|---|---|
| 713,430 | Germany | Oct. 16, 1941 |